(12) United States Patent
Kawano et al.

(10) Patent No.: US 7,385,723 B2
(45) Date of Patent: Jun. 10, 2008

(54) IMAGE FORMATION DEVICE AND IMAGE FORMATION METHOD

(75) Inventors: Katsunori Kawano, Ashigarakami-gun (JP); Hisae Yoshizawa, Ashigarakami-gun (JP); Jiro Minabe, Ashigarakami-gun (JP); Kazuhiro Hayashi, Ashigarakami-gun (JP); Yasuhiro Ogasawara, Ashigarakami-gun (JP); Shin Yasuda, Ashigarakami-gun (JP); Norie Matsui, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 834 days.

(21) Appl. No.: 10/956,112

(22) Filed: Oct. 4, 2004

(65) Prior Publication Data
US 2005/0213137 A1   Sep. 29, 2005

(30) Foreign Application Priority Data
Mar. 23, 2004   (JP)   ............................. 2004-084897

(51) Int. Cl.
*G06F 15/00* (2006.01)
*G06K 1/00* (2006.01)
*G06K 15/00* (2006.01)

(52) U.S. Cl. .................... 358/1.16; 358/1.14; 358/1.13

(58) Field of Classification Search ................ 358/1.1, 358/1.15, 1.16, 1.18, 1.8, 1.7, 1.9, 1.12, 1.13, 358/505, 530, 539, 402, 498
See application file for complete search history.

(56) References Cited

U.S. PATENT DOCUMENTS 6,600,580 B2 *   7/2003   Kihara et al. .................. 359/24

7,013,942 B2 *   3/2006   Shirakura et al. ........... 156/443

FOREIGN PATENT DOCUMENTS

| JP | A 9-90665 | 4/1997 |
|----|-----------|--------|
| JP | A 10-340479 | 12/1998 |
| JP | A 2000-211257 | 8/2000 |

OTHER PUBLICATIONS

"Great Potentiality of World's Smallest Noncontact IC Chip by Hitachi-Expectation for Creation of New Market"; http://www.hitachi.co.jp; Mycom PC Web, news headlines, Jul. 5, 2001; w/transl.

Toshihiro Wakita et al.; "A Study for linking between WWW and paper by 2D code"; Human Interface 76-1; Information Media 33-1; Jan. 29, 1998; w/transl.

Hans J. Coufal et al.; "Holographic Data Storage"; Springer; pp. 54-57; w/transl.

* cited by examiner

*Primary Examiner*—Douglas Q Tran
(74) *Attorney, Agent, or Firm*—Oliff & Berridge, PLC

(57) ABSTRACT

The present invention provides an image formation device including: an image reading section which reads an image from an image formation member, at which image formation member the image is formed and a hologram recording medium is mounted, associated information relating to the image being stored as a hologram in the hologram recording medium; an information acquisition section which acquires the stored associated information from the hologram recording medium; an image processing section which processes the image read by the image reading section in accordance with the associated information acquired by the information acquisition section; and an image formation section which forms an image processed by the image processing section.

14 Claims, 12 Drawing Sheets

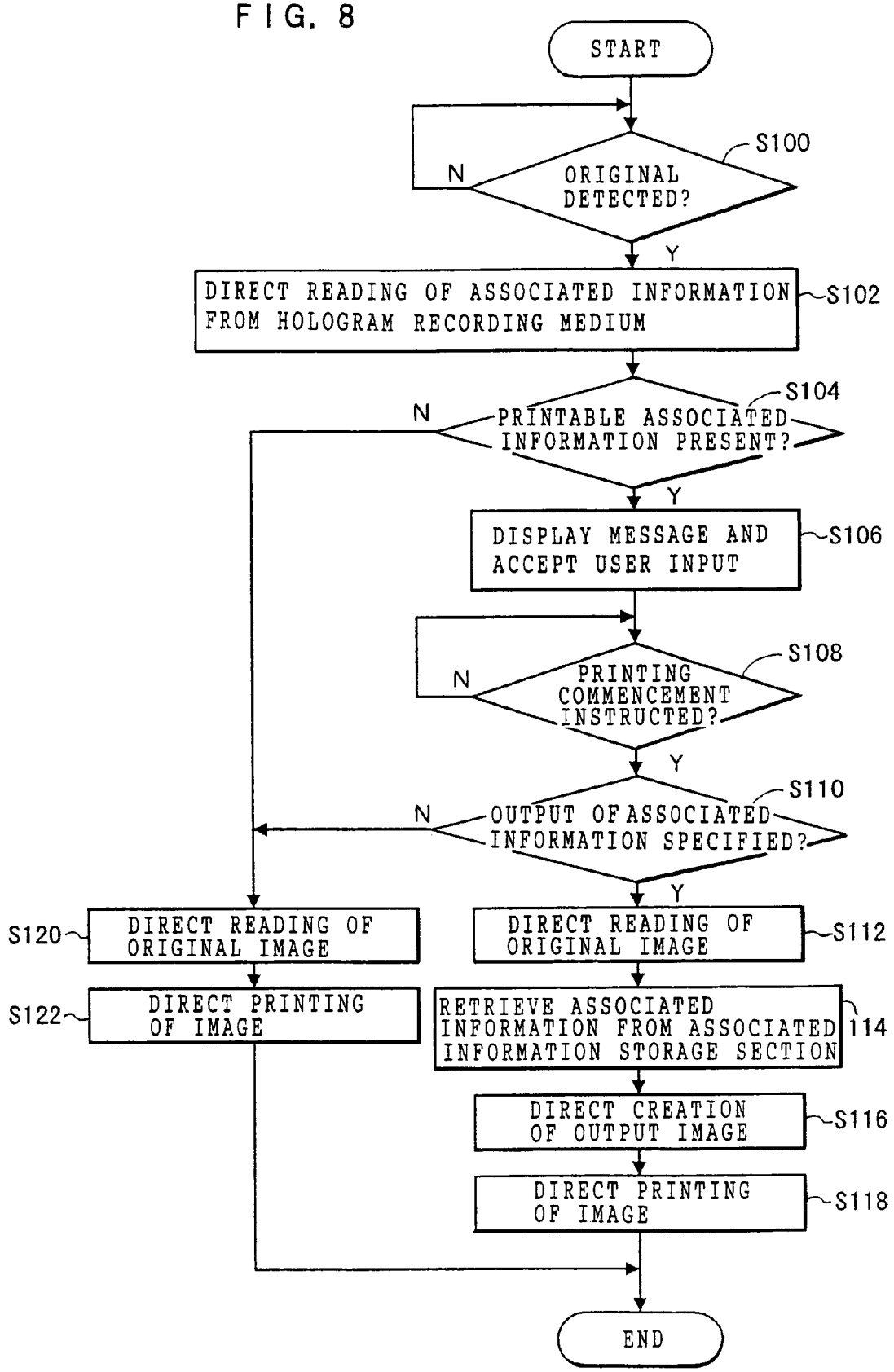

F I G. 11
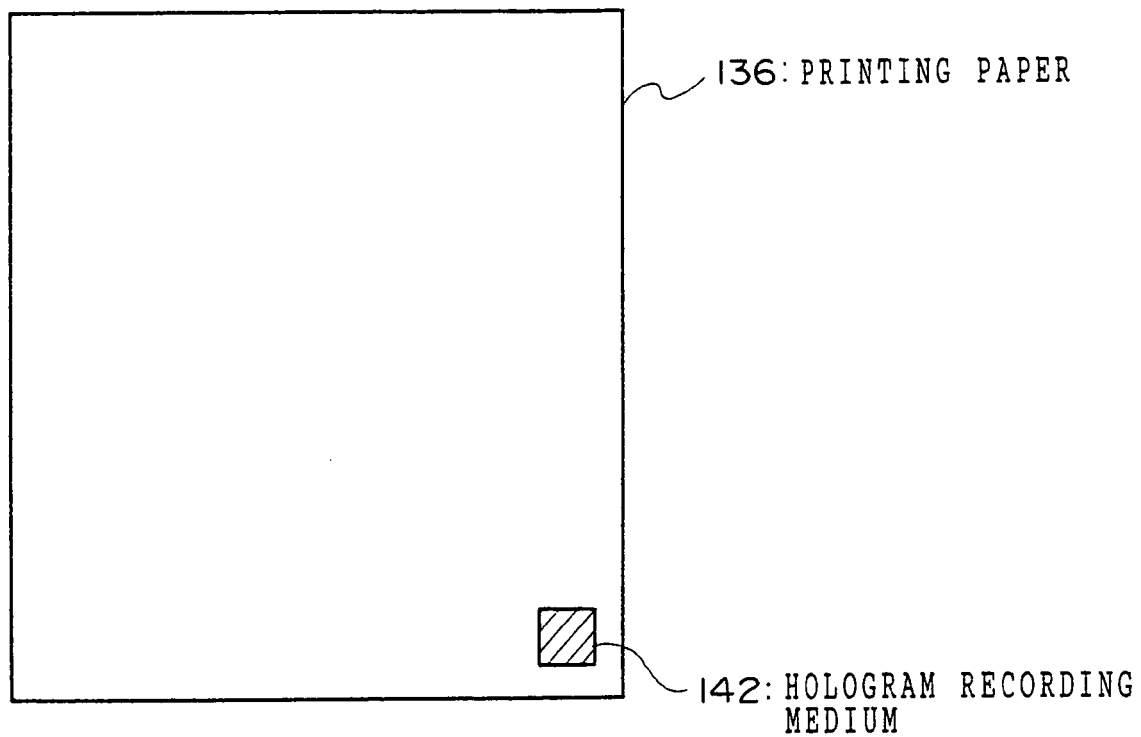

IMAGE FORMATION DEVICE AND IMAGE FORMATION METHOD

CROSS-REFERENCE TO RELATED APPLICATION

This application claims priority under 35 USC 119 from Japanese Patent Application No. 2004-84897 the disclosures of which are incorporated by reference herein.

BACKGROUND OF THE INVENTION

1. Field of the Invention

The present invention relates to an image formation device and an image formation method, and more particularly to an image formation device and image formation method for forming images on the basis of information added to an image formation member.

2. Description of the Related Art

In recent years, with the development of information communications equipment, the establishment of communications infrastructure, the spread of personal computers and so forth, it has become possible to acquire large amounts of information via electronic media which record and propagate electronic information, and to process that information on computers. On the other hand, paper media have been used as information media for recording and propagating information since the distant past. Even now, the transmission and exchange of many kinds of information is carried out with paper media such as postcards, letters, books, newspapers, etc.

Both of these have their advantages. Electronic media are excellent in regard to information processability, reusability, searchability, ease of forming associations between information, and so forth. On the other hand, paper media are excellent in regard to visual scannability, transportability, physical presence and so forth. Accordingly, rather then electronic media replacing paper media, the ideal situation is for the two to complement each other while bringing out one another's advantages.

By printing, it is possible to convert information on an electronic medium to information on a paper medium. However, digital information of the electronic medium will be lost in the process of printing. Further, while it is possible to convert information on a paper medium to information on an electronic medium with a character recognition device such as an optical character reader (OCR) or the like, in techniques that use image recognition, there are limits to recognition capabilities and conversion speeds.

In order to solve these problems, various processes of printing codes which can be digitalized, such as glyph codes, two-dimensional barcodes and the like, on paper media have been proposed. For example, a system has been proposed which integrates information on the World Wide Web (WWW) with information on paper media, by representing a URL (Uniform Resource Locator) relating to information printed on a paper medium with a two-dimensional code and printing this two-dimensional code on the paper medium ("Testing of integration of the WWW with paper media using two-dimensional codes", "Human Interface" 76-1, "Information Media" 33-1, Jan. 29, 1998).

QR CODES (R), for example, can be used as two-dimensional codes. It is possible to store 134 bytes of data with a 41×41-cell QR CODE (R), which is plenty for defining URL information or ID information. When this system is used, it is possible to read a QR CODE (R) which has been applied to a paper medium and access a WWW URL and, as required, to obtain electronic information corresponding to information on the paper medium.

Recently, μ-CHIPS (R), which are microelectronic semiconductor chips from which stored data can be read from outside without contact and which can be embedded even in paper and the like, have been developed (MYCOM PC WEB, news headlines, Jul. 5, 2001: http://pcweb.mycom-.co.jp/news/2001/07/05/22.html). Thus, when a μ-CHIP (R) storing URL information, ID information or the like is embedded in a paper medium, it is possible to acquire this information without contact.

Recording media at which, similarly to paper media, images can be formed by copiers and the like include OHP sheets. These OHP sheets have specifications which are favorable for respective copier models, and it is preferable to use branded products which are appropriate to a copier. Accordingly, an OHP sheet which is provided with a transparent hologram on the sheet for verifying whether or not the sheet is a branded product, by using an image reconstructed from the hologram, has been proposed (Japanese Patent Application Laid-Open (JP-A) No. 09-090665).

Meanwhile, a printing device which, utilizing a transfer film ribbon at which a hologram pattern has been formed in advance, transfers and prints a hologram image on a display medium such as paper or the like with a thermal head, and a display medium formed by this printing device have been proposed (JP-A No. 2000-211257). With this printing apparatus, on-demand printing of hologram images is possible.

However, the two-dimensional codes and semiconductor chips described above are only provided with storage capacities of at most several hundred bytes. These storage capacities are sufficient for storing URL information, ID information and the like but are far too small for storing, in electronic form, all of the information that is printed on a paper medium. Ultimately, it is necessary to provide a server to serve as a data center for collecting and administering electronic information, and to use the URL information, ID information and the like that has been retrieved from the two-dimensional code or semiconductor chip to gain access and download larger volumes of electronic information from the server. Thus, there is a problem in that it is necessary to create a very large-scale system for administering, with IDs, electronic information corresponding to information on paper media and for collecting this information at servers beforehand.

Furthermore, the μ-CHIP (R) described above is exclusively for reading, and writing of new information or overwriting of the stored information is not possible. Therefore, there is a problem in that the μ-CHIP (R) is not suitable for on-demand printing when there is a requirement that different electronic information is stored at each paper medium. Meanwhile, although the storage capacity of holograms is larger than that of two-dimensional codes or semiconductor chips, conventional holograms such as relief type holograms, in which protrusions and depressions are formed in a plastic film by embossing, and the like are exclusively for reading, and are similarly not suitable for on-demand printing.

Further still, paper media in which semiconductor chips are embedded pose a hazard to the environment and cannot be discarded just as they are. Consequently, there is a problem in that when paper media are being discarded, it is necessary to separate out paper media in which semiconductor chips are embedded and recover the semiconductor chips separately.

Further yet, with the display medium of JP-A No. 2000-211257, at which hologram images are printed on demand, because the hologram images are used visually, non-visible electronic information cannot be added to the display medium.

SUMMARY OF THE INVENTION

In consideration of the circumstances described above, the present invention provides an image formation device and image formation method which can utilize electronic information that has been added to an image formation member, such as a paper medium or the like, and form an image, without attachment to the image formation member of a device for which recovery is necessary.

A first aspect of the present invention is an image formation device comprising: an image reading section which reads an image from an image formation member, at which image formation member the image is formed and a hologram recording medium is mounted, associated information relating to the image being stored as a hologram in the hologram recording medium; an information acquisition section which acquires the stored associated information from the hologram recording medium; an image processing section which processes the image read by the image reading section in accordance with the associated information acquired by the information acquisition section; and an image formation section which forms an image processed by the image processing section.

A second aspect of the present invention is an image formation device comprising: an image reading section which reads an image from a first image formation member, at which the image is formed; a member information acquisition section which acquires member information relating to a second image formation member, at which a new image is to be formed, from a hologram recording medium which is mounted at the second image formation member and at which the member information is stored as a hologram; an image processing section which processes the image read by the image reading section in accordance with the member information acquired by the member information acquisition section; and an image formation section which forms the image processed by the image processing section at the second image formation member.

A third aspect of the present invention is an image formation method comprising: reading an image from an image formation member, at which image formation member the image is formed and a hologram recording medium is mounted, associated information relating to the image being stored as a hologram in the hologram recording medium; acquiring the stored associated information from the hologram recording medium; processing the image read from the image formation member in accordance with the acquired associated information; and forming the processed image.

A fourth aspect of the present invention is an image formation method comprising: reading an image from a first image formation member, at which the image is formed; acquiring member information relating to a second image formation member, at which a new image is to be formed, from a hologram recording medium which is mounted at the second image formation member and at which the member information is stored as a hologram; processing the image read from the first image formation member in accordance with the member information; and forming the processed image at the second image formation member.

The present invention features: reading an image from the image formation member, at which image formation member the image is formed and a hologram recording medium is mounted, associated information relating to the image being stored as a hologram at the hologram recording medium; acquiring the stored associated information from the hologram recording medium; processing the image that has been read from the image formation member in accordance with the associated information that has been acquired; and forming the image that has been processed.

Thus, because the associated information is stored at the hologram recording medium mounted at the image formation member beforehand, it is possible to utilize the stored associated information in image formation (image processing). Furthermore, the hologram recording medium can be cut up and/or incinerated. Therefore, unlike electronic devices such as semiconductor chips and the like, recovery thereof from the image formation member is not necessary.

As described above, according to the present invention, the associated information is stored in advance at the hologram recording medium which is mounted at the image formation member. Therefore, it is possible to utilize the associated information in image formation (image processing). Accordingly, various functions can be added to the image formation device, such as providing supplementary information to users, restricting printing and so forth. Furthermore, because it is possible to cut up and incinerate the hologram recording medium, it is not necessary to recover the hologram recording medium from the image formation member, differently from electronic devices such as semiconductor chips and the like, and disposal is easier.

BRIEF DESCRIPTION OF THE DRAWINGS

Embodiments of the invention will be described in detail with reference to the following drawings.

FIG. 8 is a flowchart representing a control routine of a device control section.

FIG. 11 is an illustration showing a printing paper on which a hologram recording medium is mounted.

DETAILED DESCRIPTION OF THE INVENTION

Below, an example of an embodiment of the present invention will be described in detail with reference to the drawings.

Original with Hologram Recording Medium Attached

Figure 1A:
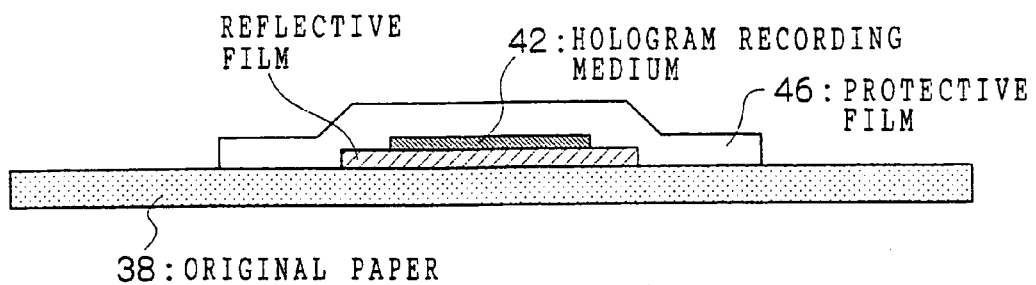
FIGS. 1A, 1B and 1C are schematic structural views showing a state in which a hologram recording medium is mounted at a paper.
Figure 1B:
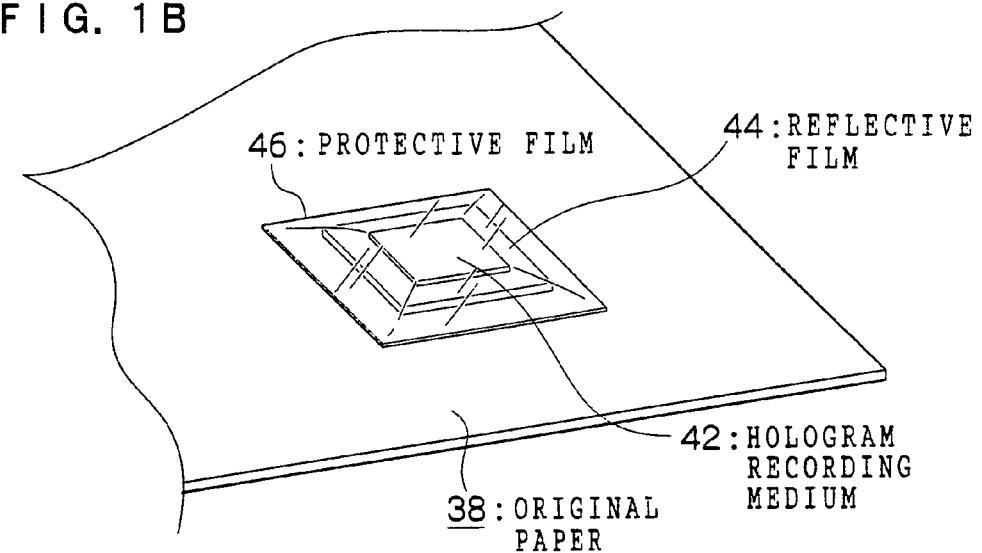
Figure 1C:
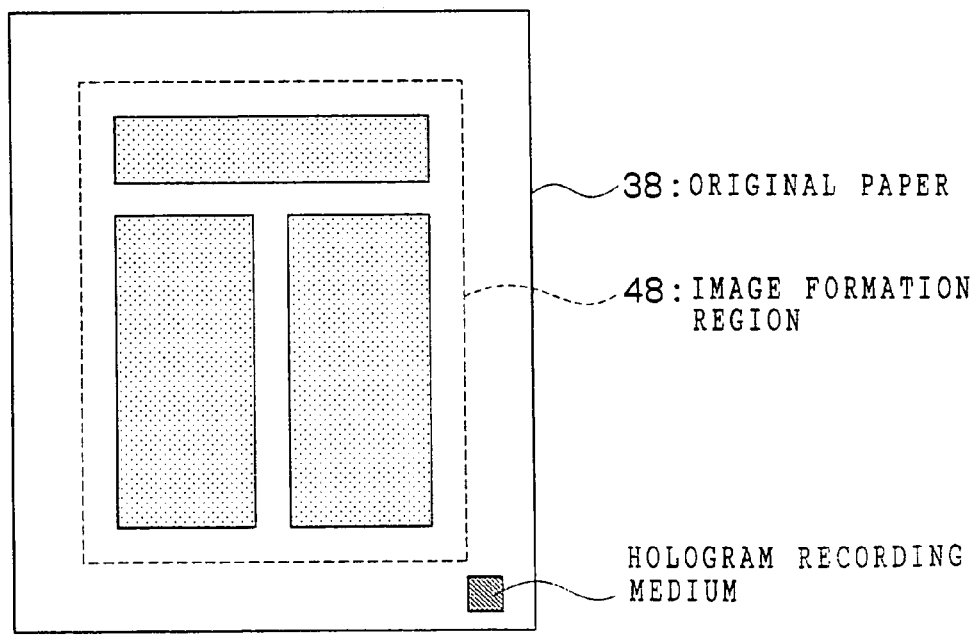

For the present embodiment, a case in which an image is formed using an original paper 38 at which a hologram recording medium 42 is mounted, as shown in FIGS. 1A to 1C, will be described. At the hologram recording medium 42, miscellaneous associated information relating to the image is stored in the form of a hologram.

FIGS. 1A and 1B are illustrations showing a state of mounting of the hologram recording medium 42. The hologram recording medium 42 is formed as a sheet-form fragment (small piece) with a thickness of several tens of μm and a surface area of several mm square. The hologram recording medium 42 is placed on a reflective layer 44, which is larger around (which is larger but not so much larger) than the hologram recording medium 42. The reflective layer 44 and the original paper 38 are stuck together by a transparent protective film 46, such that the reflective layer 44 is in contact with the original paper 38.

The hologram recording medium 42 is not particularly limited as long as it is a recording medium at which writing of a hologram is possible. As a recording material structuring such a medium, a photorefractive material, which exhibits photo-induced refractive index variations or photo-induced dichroism and maintains such characteristics at ordinary temperatures, or a polarization-responsive material can be used. Further, with these recording materials, erasure of a recorded hologram and recording of a new hologram, which is to say overwriting of a hologram, is possible by light irradiation. Among such materials, a material which is a polymer having a photoisomerizing base at a side chain, for example, one or more types of polymer selected from polyesters, and which has a photoisomerizing base at that side chain, for example, an azobenzene skeleton, is favorable.

Azobenzene repeats a cycle of isomerization, from trans to cis to trans, when irradiated with light. Before light irradiation, trans-form azobenzene molecules are present in large numbers in an optical recording layer. These molecules are randomly oriented and, viewed on a macroscopic scale, are isotropic. When irradiated with linearly polarized light, the azobenzene molecules that have an absorption axis in a direction the same as the direction of polarization are selectively isomerized from trans to cis. Molecules that are relaxed in the trans-form, having absorption axes which intersect the direction of polarization, do not absorb light at this time and are fixed in states thereof. As a result, viewed on the macroscopic scale, anisotropy of absorption coefficients and refractive indices, which is to say dichroism and birefringence, is induced. A polymer including such photo-isomerizing bases can change orientations of the molecules themselves by photo-isomerization and induce large birefringence. The birefringence that is induced in this manner is stable below the glass transition temperature of the polymer, which is favorable for recording of holograms.

For example, a polyester including cyanoazobenzene at a side chain, which is shown in the following chemical formula (see JP-A No. 10-340479), is favorable as a material for recording a hologram by the mechanism described above. With this polyester, photo-induced anisotropy is caused by photoisomerization of the side chain cyanoazobenzene, polarization directions of signal light can be recorded as a hologram, it is possible to record holograms at room temperature, and a recorded hologram can be retained semi-permanently, as long as erasing light is not irradiated thereto.

[chemical formula]

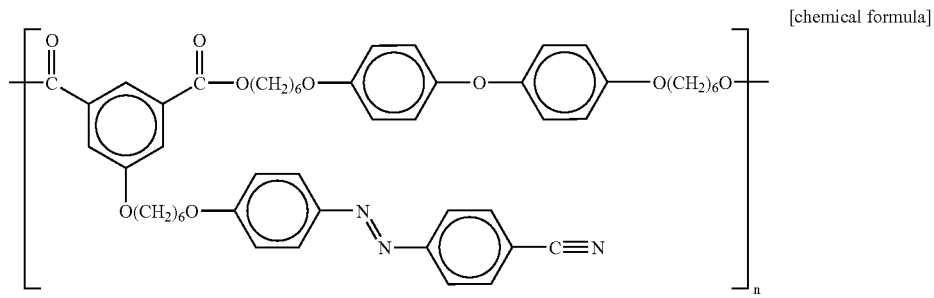

A thickness of the hologram recording medium 42 is preferably in a range of 0.1 μm to 200 μm, in view of avoiding bulkiness, and the range is more preferably 10 μm to 30 μm, in order to raise diffraction efficiency. After fabrication of a plate-form molding by injection molding, the hologram recording medium 42 is formed in a sheet shape by nipping this plate-form molding with a pair of releasable resin films and hot-pressing in a vacuum. The sheet-form hologram recording medium 42 is peeled from the resin films, and is cut to fragments of a few mm square (for example, 8 mm square) for use. It is preferable if the heating temperature is set to a temperature higher than the Tg of the recording material and the pressing pressure is set to 0.01 to 0.1 t/cm$^2$. As the releasable resin films, it is possible to use, for example, polyethylene terephthalate (PET) films whose surfaces have been coated with a silicone resin which acts as a releasing agent.

The reflective layer 44 is structured by forming a thin film of a light reflective material, whose reflectivity with respect to laser beam that is used for recording and reconstructing is at least 70%, on a base which is a resin film or the like. Examples of such a light-reflective material include, for example, metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi and the like, and stainless-steel. Among these, Au, Ag, Al and alloys thereof are preferable, and Al (aluminum) is particularly preferable. The above-described light-reflective material may be used singly or may be used in a combination of two or more types thereof.

The reflective layer 44 can be formed by, for example, vapor-depositing, sputtering or ion-plating the light-reflective material described above on a film of resin or the like. Thickness of the reflective layer 44 is preferably in a range of 1 nm to 100 μm, in view of preventing bulkiness, and within this range, thinner is better. As such a light-reflective layer, it is possible to use "RUPPY" (R), manufactured by Cemedine Co., Ltd., or the like. In a case in which the original paper 38 itself has high reflectivity, such as a coated paper, the reflective layer 44 may be omitted.

The protective film 46 is structured by a resin film which is transparent with respect to the laser beam that is used in recording and reconstructing and is flexible. Furthermore, the protective film 46 may be provided with an adhesion layer having adhesiveness, and be able to retain the sheet-form hologram recording medium 42 on this adhesion layer. If the hologram recording medium 42 can be satisfactorily mounted at a support body by crimping, an adhesion layer is not necessary. However, it will be preferable to have an adhesion layer on the protective film in a case in which the recording medium is thick, a case in which long-term stability is sought, or the like.

With a view to avoiding bulkiness, thickness of the protective film 46 is preferably in a range of 1 μm to 200 μm, and within this range, thinner is better. A transmissivity of the protective film 46, of the laser beam that is used in recording and reconstructing, is preferably at least 50% and is more preferably at least 80%, in view of light usage efficiency. As such a protective film, it is possible to use "OPP TAPE" (R), manufactured by Nitto Denko Corporation, or the like.

For the present embodiment, an example in which the hologram recording medium 42 is mounted at a face of the original paper 38 at which an image is printed (a front face) is described. However, the hologram recording medium 42 may be mounted at a face at which an image is not printed (a rear face). In a case of mounting at the front face of the original paper 38, it is preferable to keep the hologram recording medium 42 out of a region 48 at which the image is printed, as shown in FIG. 1C, and mount the hologram recording medium 42 at a margin portion which is peripheral to this region 48.

It is possible to record various associated information relating to the image in the hologram recording medium 42. This associated information may include: a) information relating to settings for printing of the image and a history; b) additional information which is not displayed on the original paper; c) region data representing regions of the original paper at which images are displayed and attribute data representing attributes of the image displayed at each region; d) verification data for restricting access to the associated information; e) output restriction information for restricting copying of the image displayed at the original paper and outputting of the associated information; and so forth.

Figure 2A:
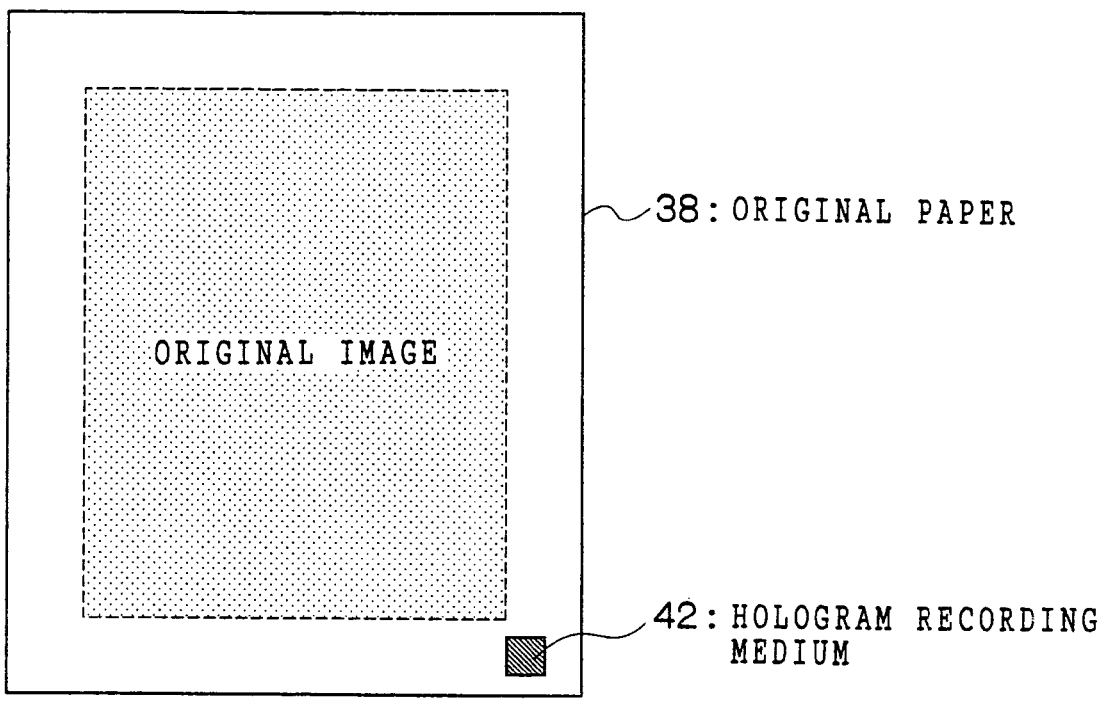
FIG. 2A is an illustration showing a layout of paper on which an original image is printed.
Figure 2B:
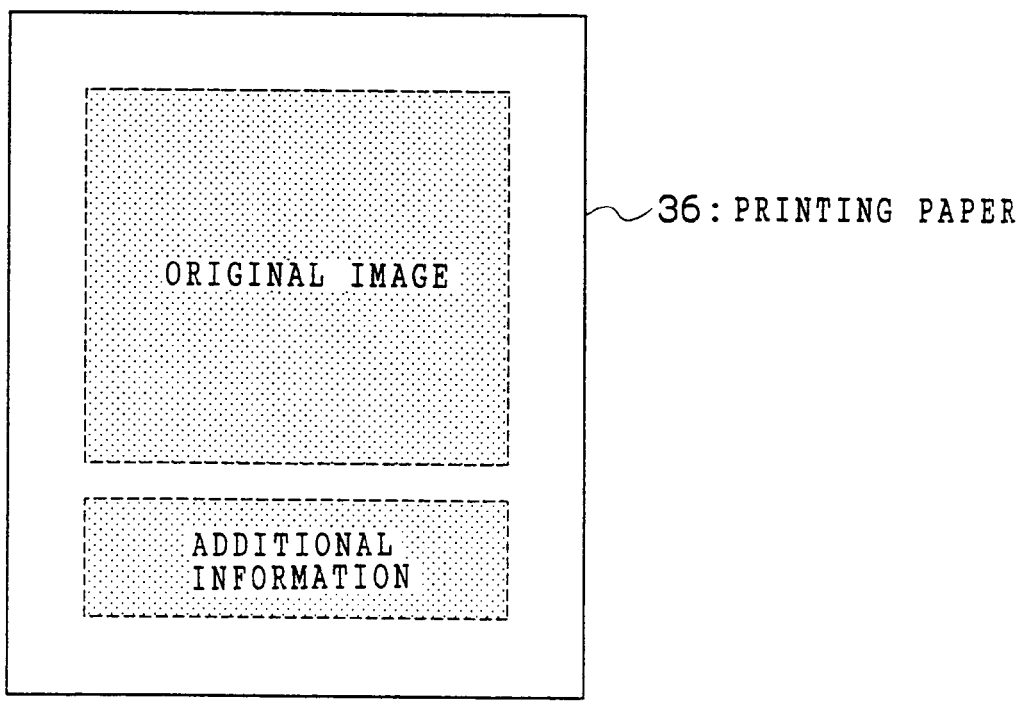
FIG. 2B is an illustration showing a layout of new paper on which additional information, which had been stored in the hologram recording medium mounted at the paper shown in FIG. 2A, is printed together with the original image.

For example, if, as shown in FIG. 2A, the hologram recording medium 42 is mounted at the original paper 38 at which the original image is printed and additional information of the above-mentioned type b) has been recorded at the hologram recording medium 42, when the image of the original paper 38 is read and this image is to be printed on a new paper, it is possible to retrieve the additional information from the hologram recording medium 42 and print the original image with the additional information at a new printing paper 36, as shown in FIG. 2B.

An example of additional information is, in a case in which a map is printed on the original paper, information about shops which are shown on the map, such as restaurants and the like (exterior views of the restaurants, information about menus, business hours and so forth).

A method of image formation in accordance with the associated information will be described in detail later.

Because the hologram recording medium 42 (an electronic medium) is affixed to the original paper 38 at which an image is printed (a paper medium) as described above, it is possible to add electronic information relating to the printed image to the original paper 38. For example, it is possible to record electronic information which is different for each piece of paper, and it is possible to perform on-demand printing to provide required numbers of prints at required times.

Further, a storage capacity of the hologram recording medium 42 is larger than that of a two-dimensional code, a semiconductor chip or the like. Thus, a new information medium, in which an electronic medium which can propagate large amounts of electronic information is integrated with a paper medium, can be provided. As will be described later, it is possible to record even larger amounts by implementing volume-multiplexed recording of holograms.

Further yet, because the electronic medium is integrated with the paper medium, it is not necessary to prepare a server or the like for collecting and administering electronic information. Thus, a large-scale system is not necessary, and costs are reduced.

Further still, the hologram recording medium 42 can be cut up together with the paper and, because the hologram recording medium 42 is an organic material, disposal thereof by incineration is possible.

Image Formation Device

Figure 3:
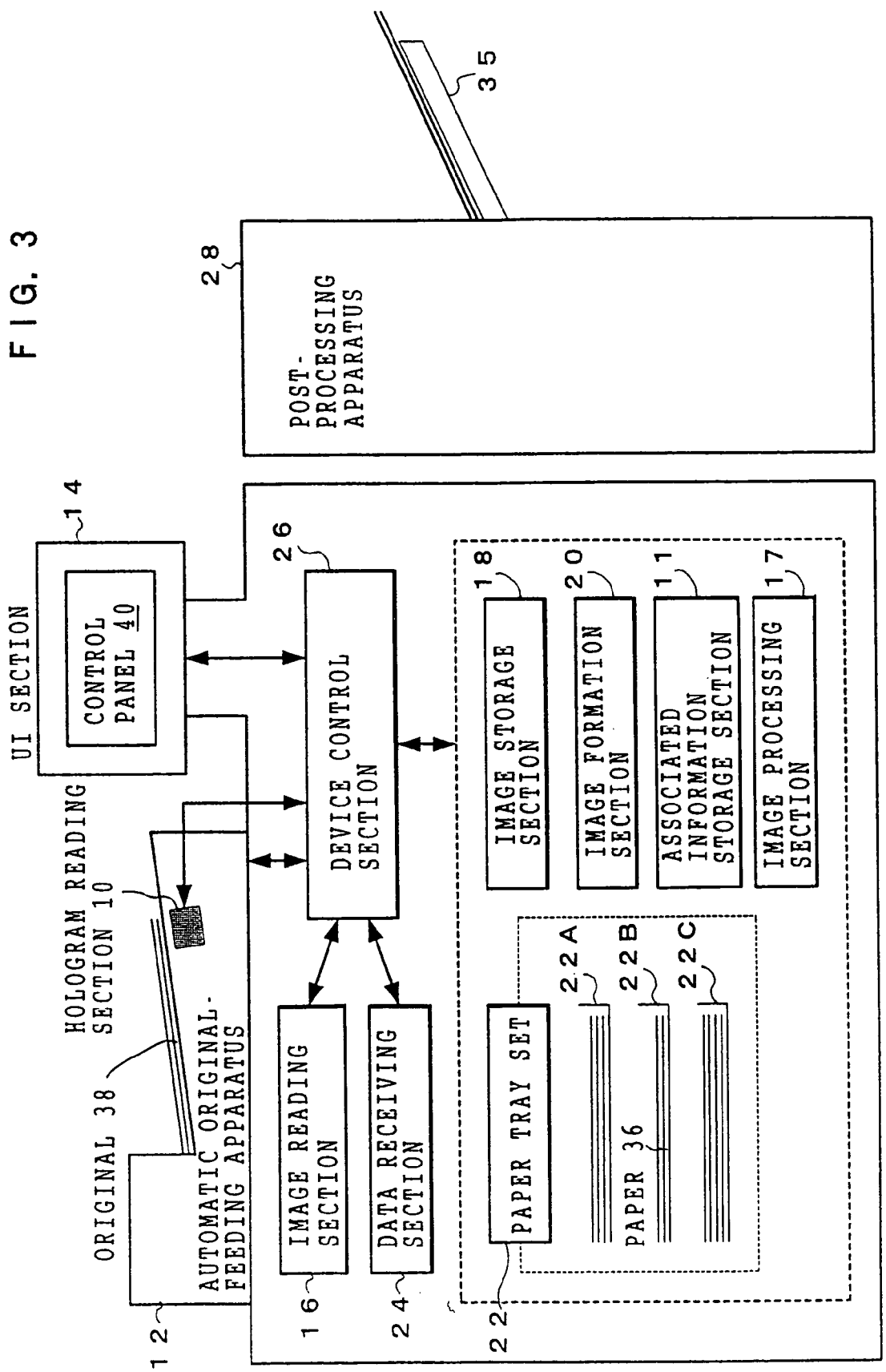
FIG. 3 is a schematic sectional diagram of an image formation device relating to an embodiment of the present invention.

An image formation device of the present embodiment, as shown in FIG. 3, is a "multifunction device" having plural functions, such as a copier, a printer, a facsimile machine and the like. The image formation device is provided with a hologram reading section 10, an associated information storage section 11, an automatic original-feeding apparatus 12, a user interface section (UI section) 14, an image reading section 16, an image processing section 17, an image storage section 18, an image formation section 20, a set of paper trays 22, a data transmitting/receiving section 24, a post-processing apparatus 28, and a device control section 26. The hologram reading section 10 reads associated information that has been recorded at the hologram recording medium 42 mounted at the original paper 38. The associated information storage section 11 temporarily stores the associated information that has been read. The automatic original-feeding apparatus 12 provides the original paper 38 to the below-described image reading section 16 one sheet at a time. At the UI section 14, the user selects desired processes and specifies numbers of sheets of paper to be printed with images, numbers of copies, etc. The image reading section 16 reads the original image. The image processing section 17 image-processes image data that has been read. The image storage section 18 temporarily stores the image data that has been image-processed. The image formation section 20 prints the image data stored in the image storage section 18 on the printing paper 36 and ejects the printing paper 36. The set of paper trays 22 is provided with plural trays 22A, 22B and 22C, so that plural kinds of the printing paper 36 can be stored. The data transmitting/receiving section 24 receives image data and the like that is transmitted from an external personal computer or the like, and transmits data to an external personal computer or the like. The post-processing apparatus 28 carries out post-processing, such as stapling and the like. The device control section 26 is provided with a CPU (not shown), memory (not shown) and the like.

The hologram reading section 10, the associated information storage section 11, the automatic original-feeding apparatus 12, the UI section 14, the image reading section 16, the image processing section 17, the image storage section 18, the image formation section 20 and the data transmitting/receiving section 24 are respectively connected to the device control section 26 via a bus (not shown), and are controlled by the device control section 26.

The UI section 14 is provided with a control panel 40, which has a structure in which a touch panel is superposed on a liquid crystal display panel. Various input screens are displayed at the control panel 40. By operating this control panel 40, a user can set numbers of output sheets of paper, numbers of output copies, quality of output images, post-processes such as stapling processing, hole-punching processing and the like, and the like, and can instruct commencement of printing operations. The UI section 14 also displays various messages according to control of the device control section 26.

The image formation section 20 is provided with a printing engine (not shown), which transfers toner images to the printing paper 36, and a fixing unit (not shown), which fixes the toner on the printing paper 36. The image formation section 20 prints images on the printing paper 36 by an electrophotographic system.

Hologram Reading Section

Next, a position at which the hologram reading section 10 is installed will be explained. In the present embodiment, the hologram reading section 10 is disposed in the automatic original-feeding apparatus 12.

Figure 4A:
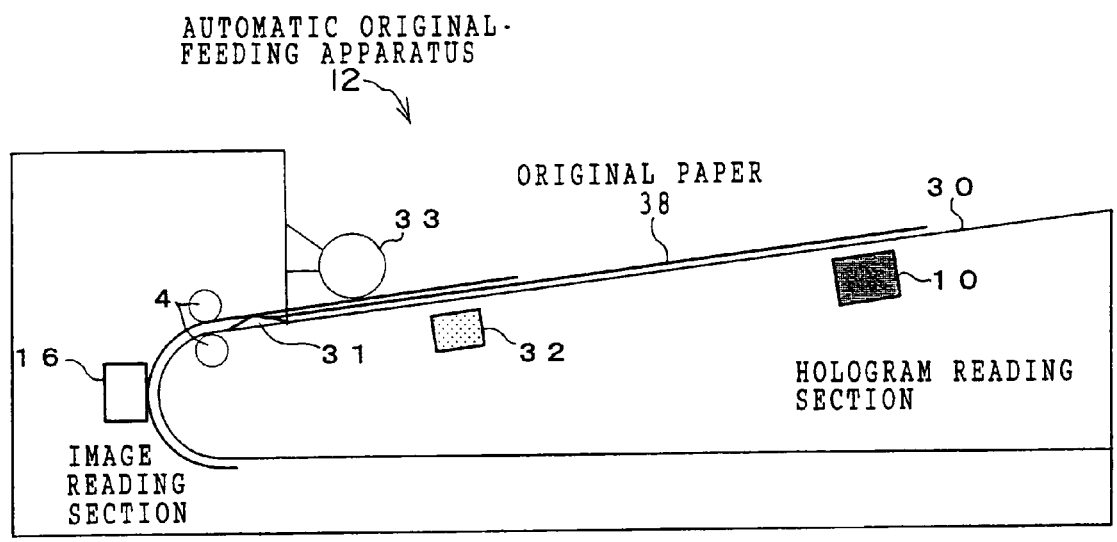
FIG. 4A is an illustration showing a position of installation of a hologram-reading portion.

As shown in FIG. 4A, the automatic original-feeding apparatus 12 is equipped with an original laying platform 30, an original stopper 31, an original detection sensor 32, a paper feeding roller 33 and a conveyance roller 34. The original laying platform 30 is provided with an inclined surface on which the original paper 38 is placed. The original stopper 31 stops the original paper 38 such that the original paper 38 does not slide down along the inclined surface. The original detection sensor 32 detects that the original paper 38 has been laid on the original laying platform 30. The paper feeding roller 33 feeds the original paper 38 that has been set thus. The conveyance roller 34 conveys the original paper 38 to the image reading section 16.

The hologram reading section 10 and the original detection sensor 32 are disposed in a vicinity of the surface of the original laying platform 30 on which the original paper 38 is laid. When laying of the original paper 38 on the original laying platform 30 is detected by the original detection sensor 32, driving of the hologram reading section 10 is controlled in accordance with a detection signal and associated information is read from a hologram recording medium (not shown in FIG. 4A) mounted at the original paper 38, as will be described later.

Figure 4B:
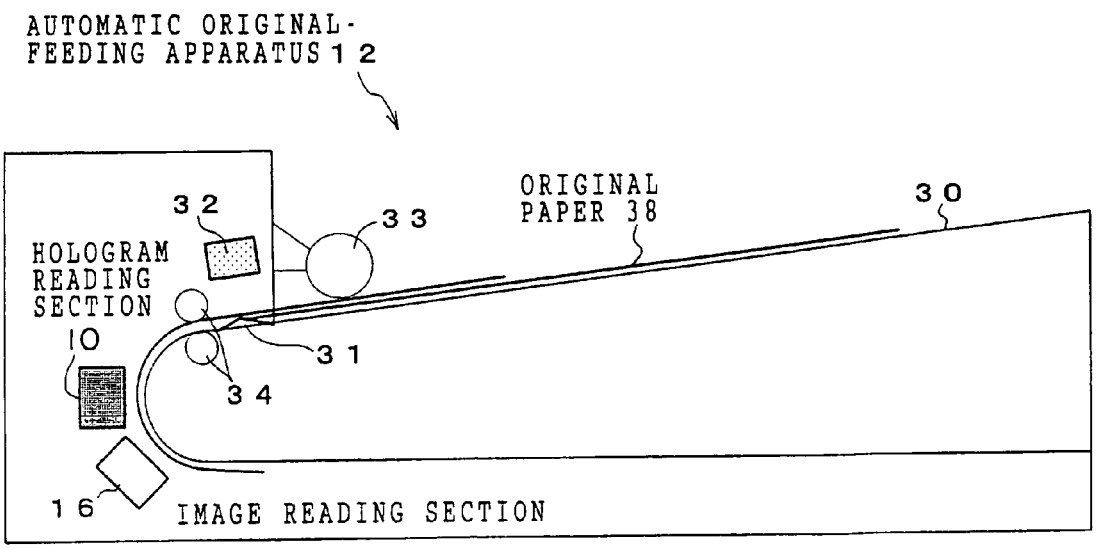
FIG. 4B is an illustration showing another position of installation of the hologram-reading portion.

As shown in FIG. 4B, the hologram reading section 10 could also be disposed (in a vicinity of a conveyance path) between the conveyance roller 34 and the image reading section 16. In such a case, the original detection sensor 32 is disposed at a conveyance direction upstream side of the conveyance roller 34, so as to detect a leading end of the original paper 38 that is fed to the conveyance path from the original laying platform 30. When the leading end of the original paper 38 is detected by the original detection sensor 32, driving of the hologram reading section 10 is controlled in accordance with a detection signal, and the associated information is read from the hologram recording medium (not shown in FIG. 4B) mounted at the original paper 38.

If the hologram reading section 10 is thus disposed in a vicinity of the conveyance path, it is possible to carry out reading of data and writing of data at each piece of paper that is conveyed therealong, and it is easier to match up read data or written data with the original paper 38.

Figure 5A:
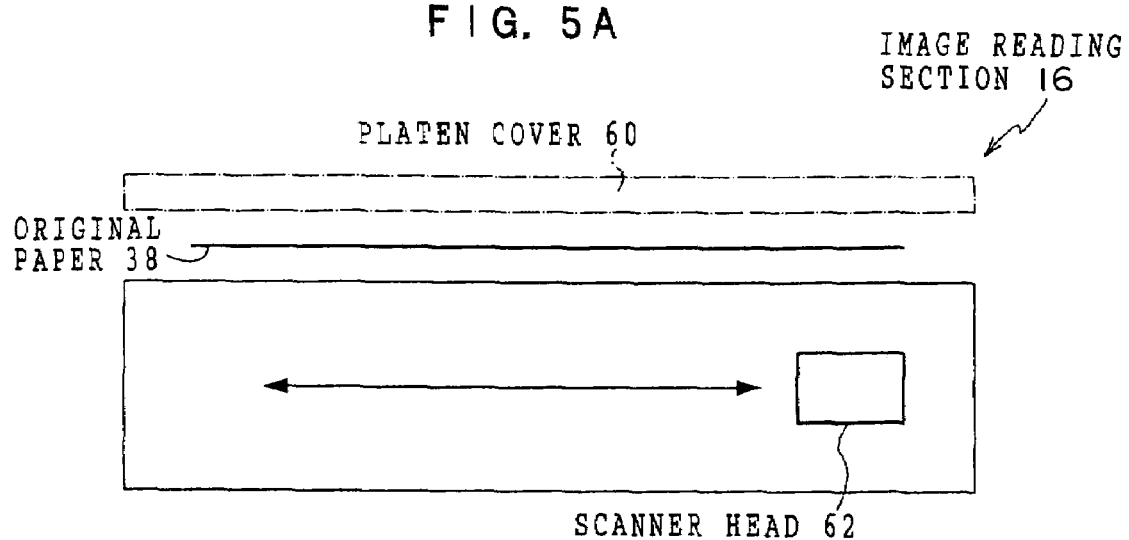
FIGS. 5A and 5B are illustrations showing yet another position of installation of the hologram-reading portion.

In the above descriptions, examples in which the hologram reading section 10 is installed at the automatic original-feeding apparatus 12 have been described. However, in a case in which the original paper 38 is laid on a platen glass (not shown) and a scanner head 62 is moved in the direction of the arrow to read the image of the laid original paper 38, as shown in FIG. 5A, the hologram reading section 10 can be disposed in the image reading section 16.

Figure 5B:
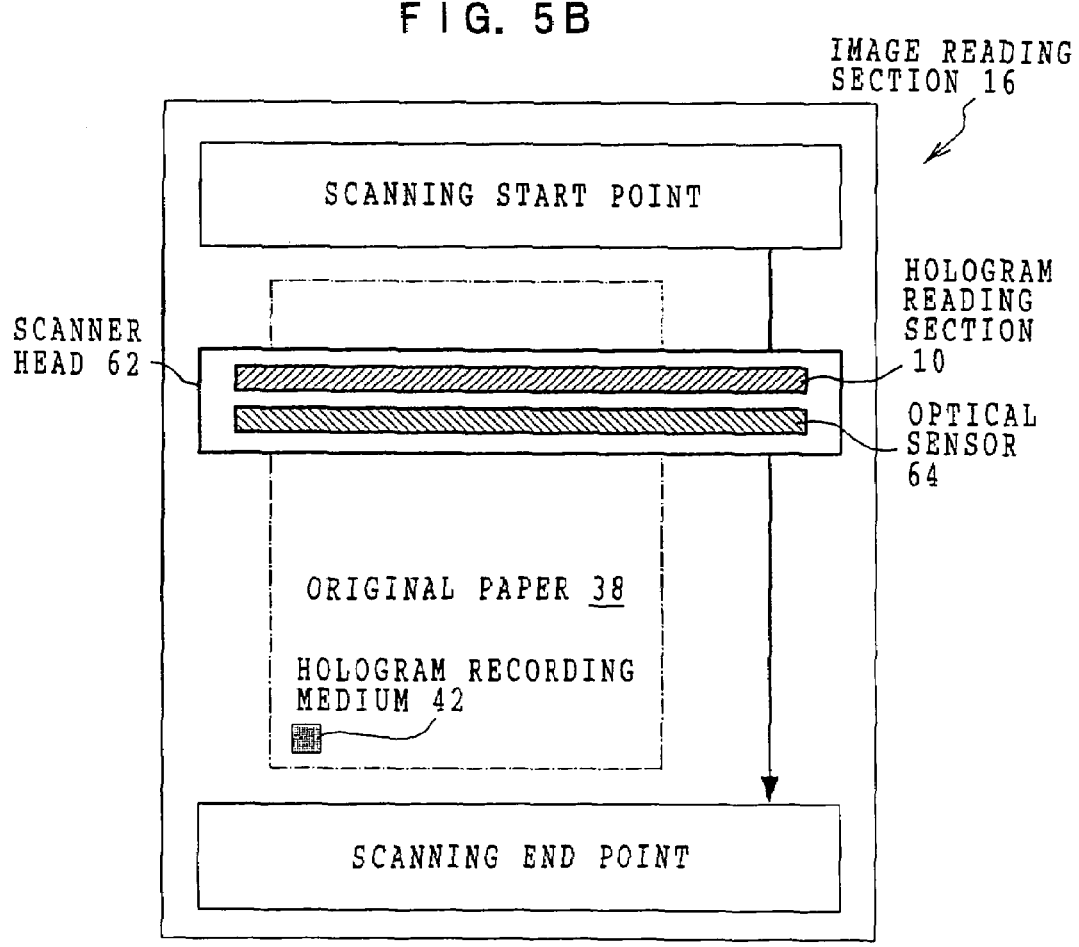

A structure of the image reading section 16 in such a case is shown in FIG. 5B. The image reading section 16 is structured by the scanner head 62 and a head-driving section (not shown), which moves the scanner head 62 in the arrow direction. An optical sensor 64, which reads the image of the original paper 38, and the hologram reading section 10 are mounted at the scanner head 62. At this image reading section 16, while the scanner head 62 is being moved from a scanning start position to a scanning end position, the original image of the original paper 38 can be read by the optical sensor 64 and the associated information recorded at the hologram recording medium 42 can be read by the hologram reading section 10.

Alternatively, the hologram reading section 10 may be disposed at a platen cover 60 which, together with the platen glass, nips the original paper 38.

Next, structure of the hologram reading section 10 will be described. Because reading of data that has been stored in the form of a hologram can be performed optically, reading of the data without contact is possible. For the present embodiment, an example is described in which the hologram reading section 10 is structured by a hologram recording/reconstructing apparatus which is capable of reading and writing holograms. With this apparatus, multiplex recording of a hologram formed by plural pages is possible.

Figure 6:
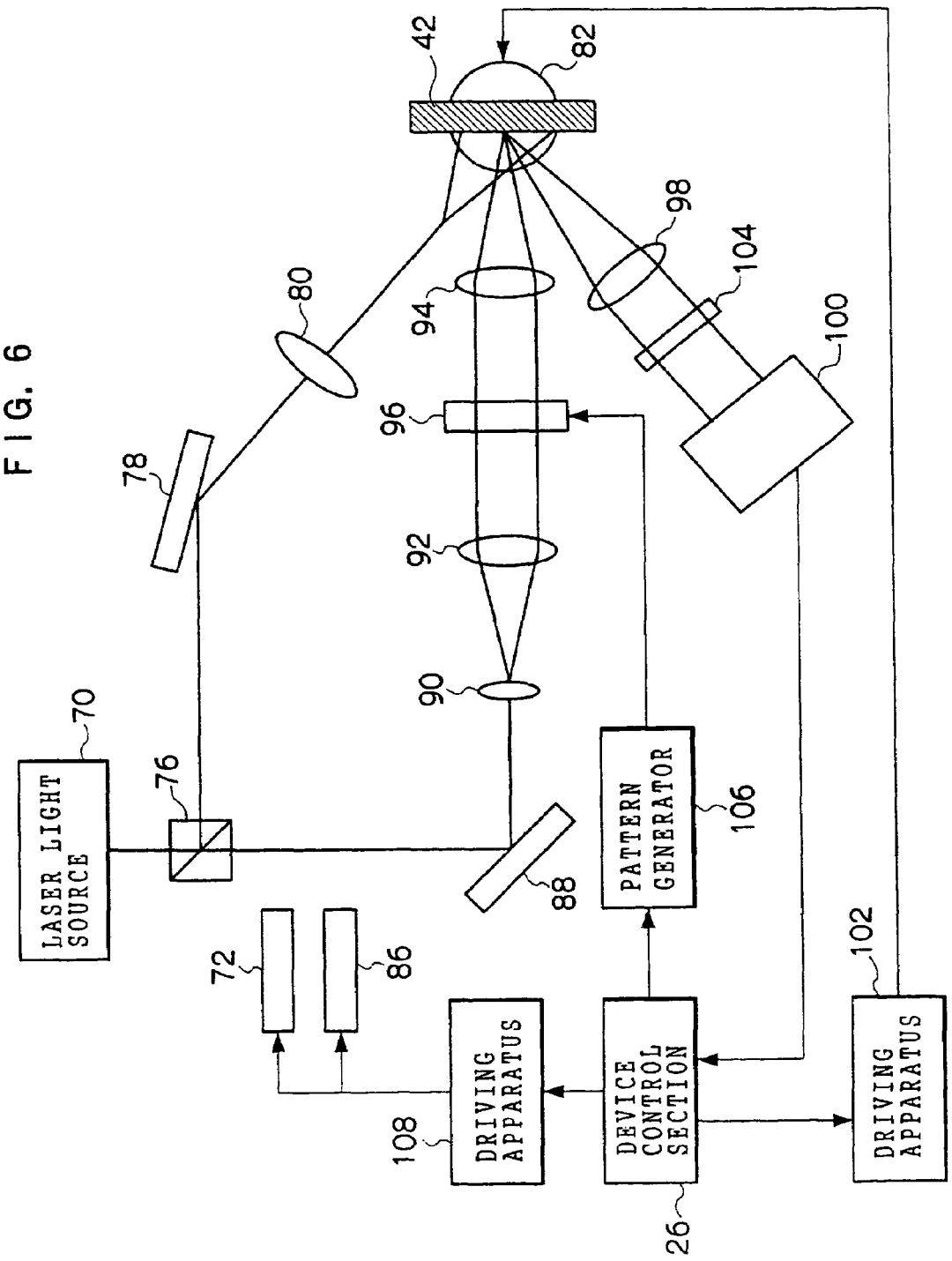
FIG. 6 is a schematic structural view of a hologram recording/reconstructing device.

As shown in FIG. 6, a laser light source 70 which uses, for example, an Nd:YVO4 crystal is provided at the hologram recording/reconstructing apparatus. Laser beam with a wavelength of 532 nm, which is coherent light, is oscillated and irradiated from the laser light source 70. A polarizing beam splitter 76 which, by transmitting p-polarized light and reflecting s-polarized light, separates the laser beam into two kinds of light, light for a reference beam and light for a signal beam, is disposed at a laser beam irradiation side of the laser light source 70.

A reflection mirror 78 and an object lens 80 are disposed in this order at a light reflection side of the polarizing beam splitter 76. The reflection mirror 78 reflects the laser beam for the reference beam and changes an optical path thereof to a direction toward the hologram recording medium. The object lens 80 focuses the laser beam for the reference beam to generate the reference beam, which is formed of spherical reference waves.

The object lens 80 irradiates the s-polarized light, being the spherical reference waves, at the hologram recording medium 42 to serve as the reference beam. An x-y stage 82 is provided at the laser beam focusing side of the object lens 80. The x-y stage 82 is equipped with a stepper motor which moves the hologram recording medium 42, which is formed as a sheet, in x and y directions.

A shutter 72 and a half-wave plate 86 are respectively disposed at a light transmission side of the polarizing beam splitter 76 to be respectively separately insertable into a light path and withdrawable from the light path. The shutter 72 is for blocking the p-polarized light that has been transmitted through the polarizing beam splitter 76, and the half-wave plate 86 rotates the polarized light surface 90°. A reflection mirror 88 and a lens system are disposed in this order at a light transmission side of the half-wave plate 86. The reflection mirror 88 reflects the laser beam for the signal beam, with a reflection angle of 45°, and changes the light path thereof to a direction toward the hologram recording medium. The lens system is structured by lenses 90, 92 and 94.

A transmission-type spatial light modulator 96 is disposed between the lens 92 and the lens 94. The spatial light modulator 96 is structured by liquid crystal elements or the like, modulates the laser beam for the signal beam in accordance with respective recording signals that are provided for each page, and generates signal beams for recording each page of the hologram.

The lenses 90 and 92 collimate the laser beam to laser beam having a broad diameter thereof and irradiate the same at the spatial light modulator 96. The lens 94 focuses p-polarized light that has been modulated and transmitted by the spatial light modulator 96 onto the hologram recording medium 42 to serve as the signal beam. Here, a focusing spot of the signal beam is focused so as to be smaller than a focusing spot of the reference beam, and the signal beam and the reference beam are irradiated to the hologram recording medium 42 simultaneously.

Because the p-polarized light serves as the signal beam and the s-polarized light serves as the reference beam, the polarization direction of the signal beam and the polarization direction of the reference beam intersect when the respective pages of the hologram are being recorded. Note that the s-polarized light could serve as the signal beam with the p-polarized light serving as the reference beam, that planes of polarization could be utilized as a signal beam and reference beam which are parallel, and that circularly polarized lights which rotate in different directions could be used as the respective signal beam and reference beam.

A lens 98, a light analyzer 104 and a detection unit 100 are disposed at a reconstructing light-reflection side of the hologram recording medium 42. The light analyzer 104 selects and transmits light with a predetermined direction of polarization from the reconstructing light (for example, a 0° polarization component, a 45° polarization component or a 90° polarization component). The detection unit 100 is structured by an image capture device such as a CCD or the like, converts received reconstructing light to electronic signals, and outputs the same. The detection unit 100 is connected to the device control section 26.

The device control section 26 is connected to the spatial light modulator 96 through a pattern generator 106. The pattern generator 106 generates patterns in accordance with recording signals, which are supplied from the device control section with predetermined timings. A driving apparatus 108 is also connected to the device control section 26. The driving apparatus 108 drives the shutter 72 and the half-wave plate 86 so as to respectively separately move into the light path, and separately withdraws the shutter 72 or half-wave plate 86 that has been moved into the light path from the light path. A driving apparatus 102 is also connected to the device control section 26. The driving apparatus 102 drives the x-y stage 82.

Next, recording and reconstructing operations of the hologram recording/reconstructing apparatus described above will be described. Here, a case in which information to be recorded is inputted to the device control section 26 beforehand and recording signals are generated in advance will be described.

At a time of processing to record a hologram, the driving apparatus 108 drives to withdraw the shutter 72 and the half-wave plate 86 from the light path, such that laser beam can pass therealong. Next, while laser beam is being irradiated and the hologram recording medium 42 is being moved in the x and y directions, recording signals of each page of the hologram are supplied to the spatial light modulator 96 with predetermined timings and a process of shift-multiplexing recording of the hologram is applied to the hologram recording medium 42, such that the respective pages of the hologram are recorded at intervals of a unit shift δ from a recording commencement position. (Holographic Data Storage, Springer, pp 54-57)

Figure 7A:
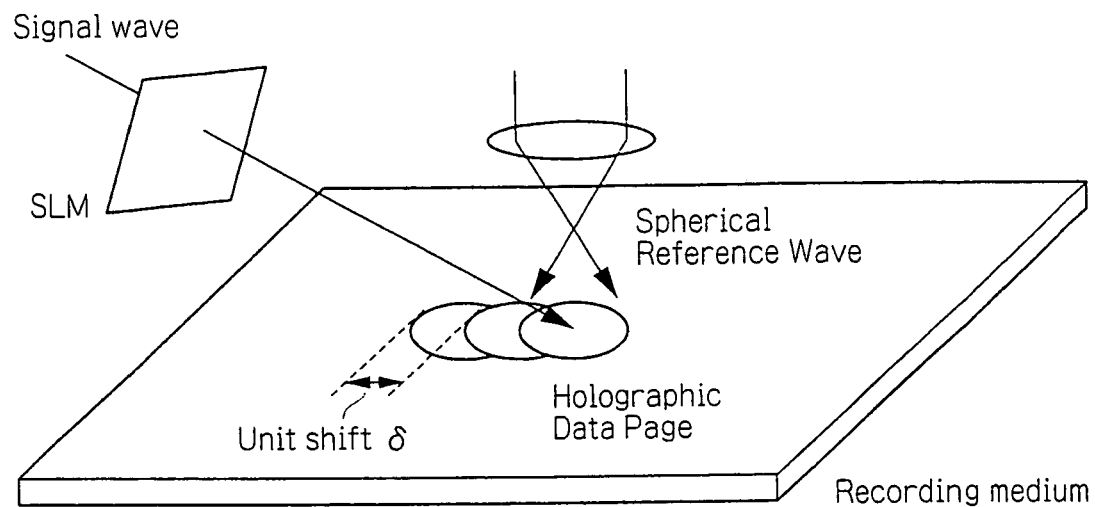
FIG. 7A is an illustration explaining the concept of shift multiplexing recording of a hologram.
Figure 7B:
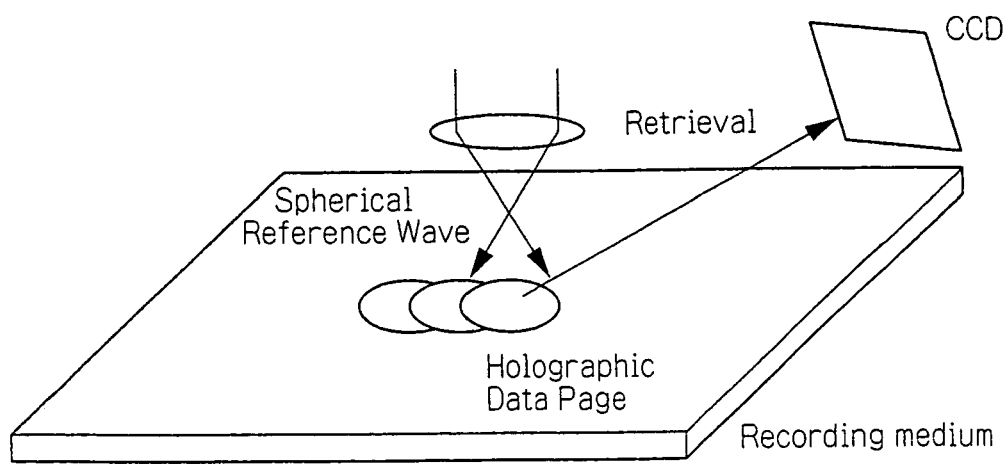
FIG. 7B is an illustration explaining how reconstruct a multiplex-recorded hologram is possible.

In a shift-multiplexing recording method of the present embodiment, the hologram recording medium 42 is moved (shifted) in the x and y directions, and the shift-multiplexed recording is implemented using the spherical waves as reference beam. With this shift-multiplexing recording method, it is possible to superpose and record a hologram of plural pages in the same region, by shifting of the medium. When the wavelength of the laser beam, film thickness of the recording medium, NA of the object lens and so forth are suitably specified, it is possible to multiplex and record the hologram of plural pages in substantially the same region of the medium simply by moving the hologram recording medium 42 such that a recording position shifts by a few tens of microns, as shown in FIGS. 7A and 7B, and reconstructing without crosstalk of the respective pages of the hologram is possible. This makes use of the fact that, because the reference beam has spherical waves, shifting the hologram recording medium (a movement of several tens of microns) is equivalent to changing an angle of the reference beam.

A distance at which the unit shift δ, of the hologram recording medium 42 in the shift-multiplexed recording that employs the spherical reference waves, is set, which is to say a distance δspherical with which the holograms can be distinctly separated from one another, is provided by the following equation (1).

[Equation (1)] (1)

$$\delta_{spherical} = \delta_{Bragg} + \delta_{NA} \approx \frac{\lambda z_0}{L\tan\theta_S} + \frac{\lambda}{2(NA)}$$

Herein, λ is a wavelength of the laser beam, $z_0$ is the distance between the object lens which generates the spherical reference waves and the hologram recording medium, L is the film thickness of the hologram recording medium, NA is the numerical aperture of the object lens, and θs is an angle between the signal beam and the reference beam. As can be seen from equation (1), the greater the thickness L of the hologram recording means, the smaller the unit shift δ, which is set in accordance with the distance which can distinctively separate the holograms from one another. Accordingly, a degree of multiplexing can be increased, and the recording capacity can be made larger.

Now, during processing for reconstructing of a hologram, the shutter 72 is moved into the light path. Consequently, because the laser beam that has passed through the polarizing beam splitter 76 is blocked by the shutter 72, only the reference beam is irradiated to the hologram recording medium 42 in which the hologram had been recorded. Reconstructing light, which has been diffracted at the hologram recording medium 42, passes through the lens 98, and only a component of the reconstructing light with the predetermined polarization is selected and transmitted by the light analyzer 104. Reconstructing light that is received at the detection unit 100 is converted to electronic signals by the detection unit 100, which are inputted to the device control section 26. The data that is read thus is stored in an associated information storage section 11.

Here, in the above description, an example in which the hologram recording medium 42 is moved and shift-multiplexed recording is carried out has been described. However, rather than moving the hologram recording medium 42, it is also possible to scan the signal beam and the reference beam over the hologram recording medium 42.

Further, in the above description, an example has been described in which the hologram reading section 10 is structured as a hologram recording/reconstructing apparatus. However, if a function for recording of holograms is not required, structure of recording portion structures may be omitted.

Image Formation Operation

Next, an operation in a case of image formation at the image formation device described above, for an example in which the information that is to be stored as associated information is "additional information which is not displayed at the original paper", will be described.

FIG. 8 is a flowchart showing a control routine of the device control section 26.

In a step 100, it is judged whether or not the original paper 38 has been detected by the original detection sensor 32. When the original paper 38 is set on the original laying platform 30 by a user, the original paper 38 is detected by the original detection sensor 32, and a detection signal is inputted to the device control section 26. Accordingly, it is judged that the original paper 38 has been detected when this detection signal is inputted. In step 102, the hologram reading section 10 is driven and controlled to retrieve the associated information from the hologram recording medium 42 mounted at the original paper 38. The associated information that has been retrieved is stored at the associated information storage section 11. If there are plural sheets of the original paper 38, the retrieval of the associated information is performed for each piece of paper.

The contents of the associated information that is retrieved thus may be displayed at the control panel 40 of the UI section 14. A user can verify the contents displayed at the control panel 40. Further, by operation of the control panel 40, it is also possible to implement overwriting of the data recorded in the hologram recording medium 42.

Then, in step 104, it is judged whether or not associated information that is printable (image data or text data) is present. If there is such associated information, in step 106, a message that there is associated information is displayed at the control panel 40 of the UI section 14. User inputs are accepted in relation to whether the associated information should be outputted, which associated information should be outputted, what output format should be used, and so forth. Attributes of the data (image data, text data, sound data or the like) can be judged from, for example, extensions that are appended to data filenames of the additional information (.txt, .html, etc.).

Figure 9A:
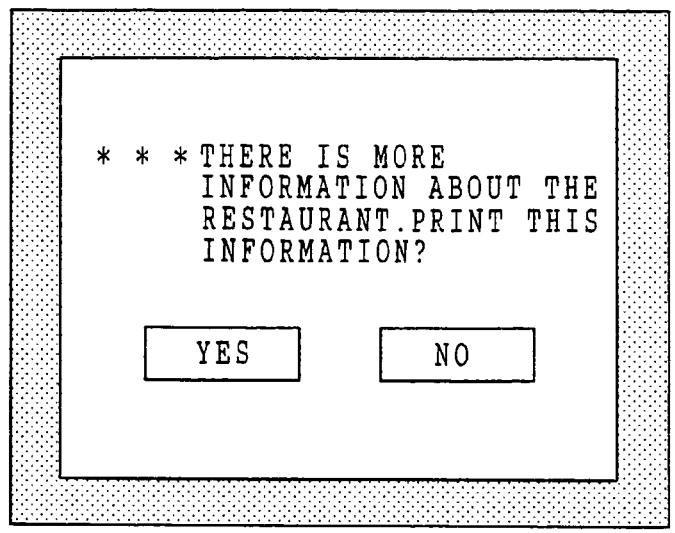
FIGS. 9A, 9B and 9C are illustrations showing screens which are displayed at a control panel.
Figure 9B:
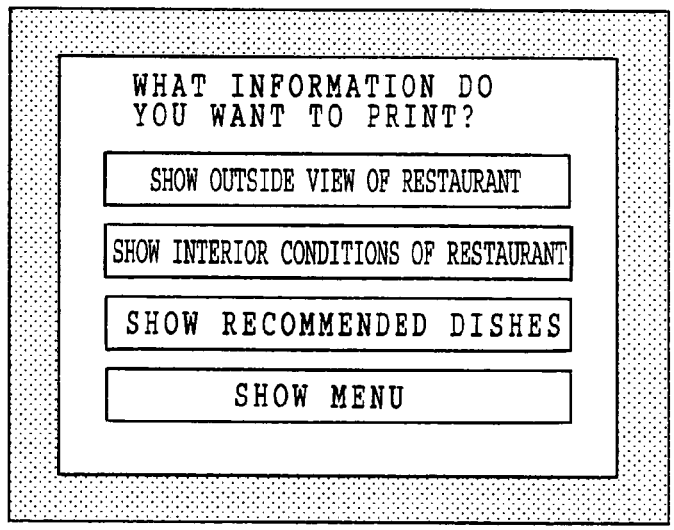

For example, a printing selection screen, as shown in FIG. 9A, is displayed at the control panel 40. In this printing selection screen, a message that additional information is present is displayed, and it is possible to select printing of the additional information. If "Yes" is selected here, an information selection screen for selecting additional information to be outputted is displayed next, as shown in FIG. 9B. In the example here, information relating to an outside view of a restaurant, conditions inside the restaurant, recommended dishes and the menu has been added, and it is possible to select additional information to be outputted from these types of information.

Figure 9C:
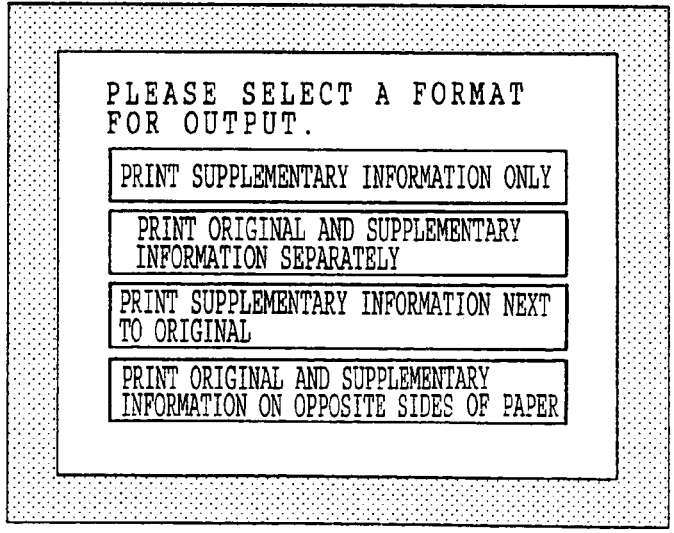

When the user operates the control panel 40 to select some kind of information, a setting screen for specifying an output format is displayed, as shown in FIG. 9C. In the example here, the output formats "Print supplementary information only", "Print original and supplementary information separately", "Print supplementary information next to original" and "Print original and supplementary information on opposite faces" are displayed as options. It is possible to specify a desired output format from among these options. Here, "supplementary information" is the same as "additional information".

Furthermore, the user can, by operating the control panel 40 of the UI section 14, set numbers of sheets of paper to output, numbers of copies and the like and apply post-processing settings, and the user can instruct a printing operation to begin. Information specified by the user is inputted to the device control section 26 and is administered by the device control section 26.

Next, in step 108, it is judged whether or not commencement of the printing operation has been instructed. When it is judged that such commencement of the printing operation has been instructed, next, in step 110, it is judged whether or not output of associated information has been specified. If the output of associated information has been specified, in step 112, the automatic original-feeding apparatus 12 is driven and controlled to convey the original to the image reading section 16, the image reading section 16 is driven and controlled to read the image of the original that has been conveyed, and the read image data is inputted to the image processing section 17. Further, in step 114, associated information related to the output settings is retrieved from the associated information storage section 11, and the retrieved associated information is inputted to the image processing section 17.

Then, in step 116, the image processing section 17 is controlled to combine the image data inputted from the image reading section 16 with the associated information (image data or text data) inputted from the associated information storage section 11, and an output image (combined image) is created. The created output image data is stored at the image storage section 18. In step 118, the output image data stored at the image storage section 18 is read out, and the image formation section 20 is driven and controlled to print an image on the printing paper 36 in accordance with the output image data. The paper is ejected to a collecting tray 35 of the post-processing apparatus 28, and the routine ends.

Figure 10:
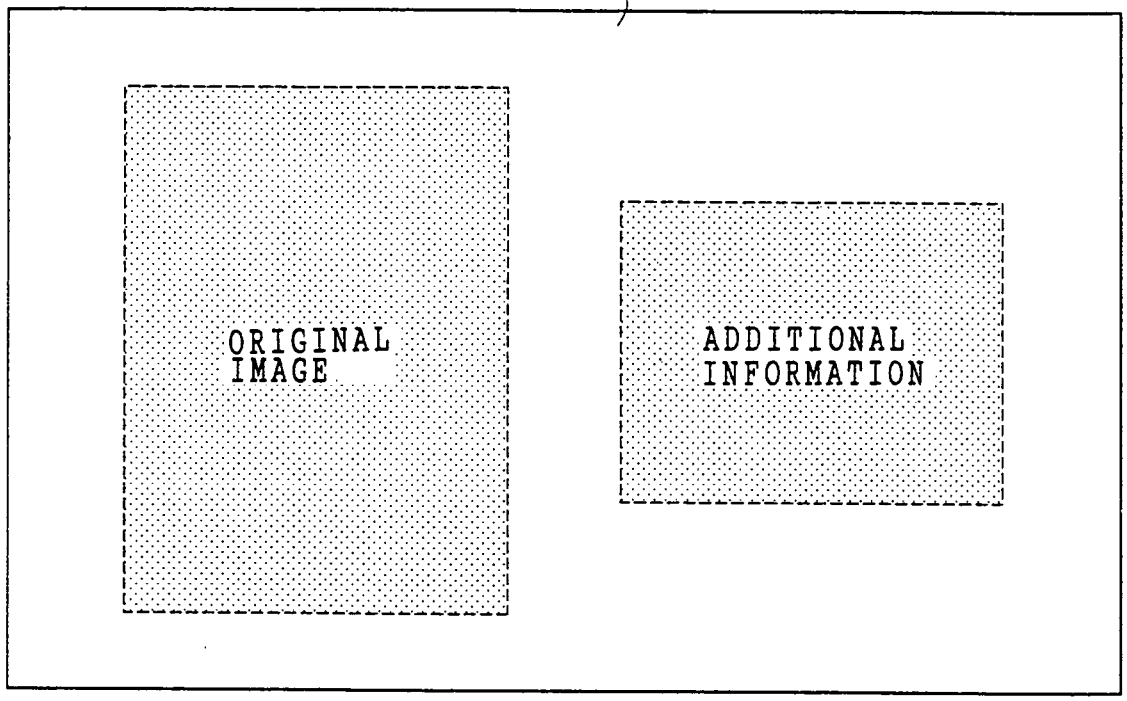
FIG. 10 is an illustration showing a layout in which additional information is printed next to an original image.

For example, in a case in which output in the output format "Print supplementary information next to original" is specified at the setting screen shown in FIG. 9C, the combined image is created such that the original image and additional information are arranged next to one another and printed on one side of the printing paper 36, as shown in FIG. 10.

On the other hand, if it is judged in step 104 that there is no associated information that is printable, or if it is judged in step 110 that output of associated information is not specified, only the original image that is read is printed, as is usual. That is, the automatic original-feeding apparatus 12, the image reading section 16, the image processing section 17, the image storage section 18 and the image formation section 20 are respectively controlled to print the image on the paper, the paper is ejected to the collecting tray 35 of the post-processing apparatus 28 and the routine ends.

Specifically, in step 120, the automatic original-feeding apparatus 12 is driven and controlled to convey the original to the image reading section 16, and the image reading section 16 is driven and controlled to read the image of the original that has been conveyed thereto. The image data that has been read is image-processed by the image processing section 17 and temporarily stored at the image storage section 18. Then, in step 122, the image data stored at the image storage section 18 is read out, the image formation section 20 is driven and controlled to print an image on the printing paper 36 in accordance with the image data that has been read out, the paper is ejected to the collecting tray 35 of the post-processing apparatus 28 and the routine ends.

Cases in which there is no associated information that is printable include a case in which there is no hologram recording medium 42 mounted at the original paper 38, a case in which the hologram recording medium 42 is mounted but no associated information is stored, a case in which the associated information is sound data, and so forth.

As has been described above, in the present embodiment, a large volume of electronic information relating to an original image (associated information) can be retrieved from a hologram recording medium mounted at an original paper, and an image can be formed using this associated information. For example, in a case in which there is extra information that is not displayed at the original paper (additional information), image data can be combined such that this additional information will be printed together with the original image, and an image can be printed on the basis of the combined image data. Thus, the extra information is provided to users.

Furthermore, in a case in which printable associated information (image data or text data) is present, it is possible to inform a user of this fact by displaying a message that there is associated information at an operation panel. Because users will be aware of the presence of the additional information, it is expected that the information will be more effectively utilized.

EXAMPLES

In the embodiment described above, an example of storing additional information which is not shown on the original paper has been described. However, associated information which is associated with an image may be the information described below. Further, it is also possible to encode image data of the original image and store the whole of this data in the hologram recording medium as digital data.

(a) Information Relating to Settings for Printing of an Image and to a Printing History It is possible, for example, to store information relating to settings for output when reading and printing an original image, sending a fax or the like, and to output images in accordance with these output settings. Further, it is possible to store printing parameters (image formation settings) which specify printing processes, such as color copying/monochrome copying, numbers of sheets to print, magnification/enlargement/reduction, N-up printing and the like, and to perform printing (image formation) in accordance with these printing parameters. In this case, it is possible to store a history of printing (for example, that the image has been printed by N-up and so forth), and to make use of this history at times of image formation.

(c) Region Data Representing Regions of the Original Paper at Which Images are Displayed, and Attribute Data Representing Attributes of the Image Displayed at Each Region For example, region data indicating that a region is a text region, in which a text image that has been printed with a pre-specified font is shown, or a graphical image region, in which a graphical image such as a photograph, handwritten text or the like is shown, is stored in association with an attribute (for example, a text, a graphical image or the like) of the image shown in that region. It is then possible to use this region data and attribute data to separate text images from graphical images, perform character recognition processing only on separated-out text images and suchlike, and thus perform respectively suitable processes on text images, graphical images and the like within the image.

(d) Verification Data for Restricting Access to the Associated Information

For example, with information which is confidential (secret information), a password to be used for verification of access to this secret information is stored. Printing of the secret information is enabled only if access to the secret information is confirmed.

(e) Output Restriction Information for Restricting Copying of the Image Displayed at the Original Paper and Outputting of the Associated Information For example, layout information indicating a specific region for which printing and transmission is restricted and processing detail information which indicates contents of processing (erasure, encryption or the like) of an image that is read from within that specific region, are stored. It is then possible, by processing the image read from the specific region in accordance with this processing detail information, to restrict printing and transmission.

In the embodiment described above, an example of printing an original image and additional information on printing paper has been described. However, the additional information could be displayed at a UI device, and could be transmitted by fax or transmitted as image data via a communications device.

Figure 12:
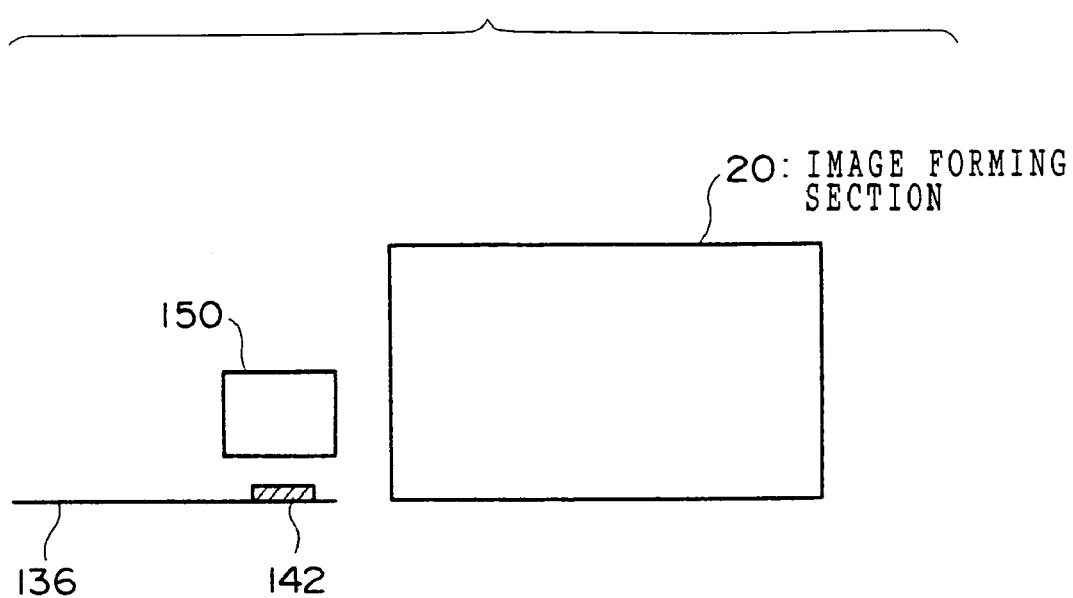
FIG. 12 is an illustration showing a member information acquisition section.

Further, in the embodiment described above, an example of retrieving associated information from a hologram recording medium mounted at an original paper has been described. However, as shown in FIG. 11, it is also possible to mount a hologram recording medium 142 in which associated information is stored at a printing paper 136 and to form images on the printing paper 136 in accordance with the stored associated information. As the image formation device, it is possible to use the device similar to that in the embodiment described above. At this time, as shown in FIG. 12, the associated information is read by a hologram reading section 150. In FIG. 12, the hologram reading section 150 is disposed in the vicinity of the image formation section 20. However, a position at which the hologram reading section 150 is disposed is not limited. For example, the hologram reading section 150 can be disposed in the vicinity of the paper trays 22, at a conveyance path between the paper trays 22 and the image formation section 20, or in the vicinity of a tray for manual paper feed. For example, it is possible to store attribute data which represents attributes of the printing paper (size, thickness, material and the like), and to judge whether two-sided printing is possible and the like, that is, whether or not printing is allowable, from this attribute data of the printing paper.

Further, it is possible to retrieve associated information from a hologram recording medium mounted at an original paper and also retrieve associated information from a hologram recording medium mounted at a printing paper, and to process and form an image on the printing paper in accordance with the both associated information.

Further again, in the embodiment described above, an example which uses paper as an image formation member has been described. However, besides paper, it is also possible to use metals (aluminum and the like) plastics, ceramics (alumina and the like) and the like as image formation members. Shapes of image formation members are not particularly limited, but film form members are preferable.

For example, it is possible to use a resin film for overhead projection (OHP) as an image formation member. Usually, a light-transmissive resin film is used for OHP. Polyester films, particularly biaxially oriented polyethylene terephthalate films, are often used as light-transmissive resin films. Note that in a case in which the image formation member is transparent, it is possible to record and reconstruct hologram, with the hologram recording medium being as a transmission medium.

In the first aspect of the present invention, it is possible that the associated information includes at least one of: a) information relating to setting for formation of the image at the image formation member and to history of formation of the image; b) additional information which is not displayed at the image formation member; c) region data representing a region of the image formation member at which an image is displayed, and attribute data representing an attribute of the image displayed at each region; d) verification data for restricting access to the associated information; and e) output restriction information for restricting copying of the displayed image and outputting of the associated information.

Further, it is possible that when the associated information includes the information relating to the setting for formation of the image at the image formation member and to the history, the image processing section processes the image read by the image reading section in accordance with the information relating to the setting and the history.

Further, it is possible that when the associated information includes the additional information which is not displayed at the image formation member, the image processing section processes the image read by the image reading section so as to additionally display the additional information.

Further, it is possible that when the associated information includes the region data representing a region of the image formation member at which an image is displayed and the attribute data representing an attribute of the image displayed at each region, the image processing section processes the image read by the image reading section so as to carry out processing in accordance with the attribute of the displayed image at each region.

Further, it is possible that the device further comprises a verification section which performs verification of right of access to the associated information, and when the associated information includes the verification data for restricting access to the associated information, the image processing section processes the image read by the image reading section only if access to the associated information is verified by the verification section.

Further, it is possible that when the associated information includes the output restriction information for restricting copying of the displayed image and outputting of the associated information, the image processing section processes the image read by the image reading section so as to restrict copying of the displayed image and output the associated information according to the output restriction information.

Further, it is possible that the device comprises an information provision section which provides the associated information acquired by the information acquisition section to outside the image formation device.

Further, it is possible that the information provision section includes at least one of a display apparatus, a communications apparatus and a printing apparatus.

Further, it is possible that the device further comprises an interface section which, when the information acquisition section acquires the associated information, displays notification that the associated information is acquired and accepts a user instruction relating to output of the associated information.

Further, it is possible that the device further comprises an information writing section which writes associated information to the hologram recording medium.

What is claimed is:

1. An image formation device comprising:
    an image reading section which reads an image from an image formation member, at which image formation member the image is formed and a hologram recording medium is mounted, associated information relating to the image being stored as a hologram in the hologram recording medium;
    an information acquisition section which acquires the stored associated information from the hologram recording medium;
    an image processing section which processes the image read by the image reading section in accordance with the associated information acquired by the information acquisition section; and
    an image formation section which forms an image processed by the image processing section.

2. The image formation device of claim 1, wherein the associated information includes at least one of:
    a) information relating to setting for formation of the image at the image formation member and to history of formation of the image;
    b) additional information which is not displayed at the image formation member;
    c) region data representing a region of the image formation member at which an image is displayed, and attribute data representing an attribute of the image displayed at each region;
    d) verification data for restricting access to the associated information; and
    e) output restriction information for restricting copying of the displayed image and outputting of the associated information.

3. The image formation device of claim 2 wherein, when the associated information includes the information relating to the setting for formation of the image at the image formation member and to the history,
    the image processing section processes the image read by the image reading section in accordance with the information relating to the setting and the history.

4. The image formation device of claim 2 wherein, when the associated information includes the additional information which is not displayed at the image formation member, the image processing section processes the image read by the image reading section so as to additionally display the additional information.

5. The image formation device of claim 2 wherein, when the associated information includes the region data representing a region of the image formation member at which an image is displayed and the attribute data representing an attribute of the image displayed at each region, the image processing section processes the image read by the image reading section so as to carry out processing in accordance with the attribute of the displayed image at each region.

6. The image formation device of claim 2, further comprising a verification section which performs verification of right of access to the associated information, wherein, when the associated information includes the verification data for restricting access to the associated information, the image processing section processes the image read by the image reading section only if access to the associated information is verified by the verification section.

7. The image formation device of claim 2 wherein, when the associated information includes the output restriction information for restricting copying of the displayed image and outputting of the associated information, the image processing section processes the image read by the image reading section so as to restrict copying of the displayed image and output the associated information according to the output restriction information.

8. The image formation device of claim 1, further comprising an information provision section which provides the associated information acquired by the information acquisition section to outside the image formation device.

9. The image formation device of claim 8, wherein the information provision section includes at least one of a display apparatus, a communications apparatus and a printing apparatus.

10. The image formation device of claim 1, further comprising an interface section which, when the information acquisition section acquires the associated information, displays notification that the associated information is acquired and accepts a user instruction relating to output of the associated information.

11. The image formation device of claim 1, further comprising an information writing section which writes associated information to the hologram recording medium.

12. An image formation device comprising:

an image reading section which reads an image from a first image formation member, at which the image is formed;

a member information acquisition section which acquires member information relating to a second image formation member, at which a new image is to be formed, from a hologram recording medium which is mounted at the second image formation member and at which the member information is stored as a hologram;

an image processing section which processes the image read by the image reading section in accordance with the member information acquired by the member information acquisition section; and an image formation section which forms the image processed by the image processing section at the second image formation member.

13. An image formation method comprising:

reading an image from an image formation member, at which image formation member the image is formed and a hologram recording medium is mounted, associated information relating to the image being stored as a hologram in the hologram recording medium;

acquiring the stored associated information from the hologram recording medium;

processing the image read from the image formation member in accordance with the acquired associated information; and forming the processed image.

14. An image formation method comprising:

reading an image from a first image formation member, at which the image is formed;

acquiring member information relating to a second image formation member, at which a new image is to be formed, from a hologram recording medium which is mounted at the second image formation member and at which the member information is stored as a hologram;

processing the image read from the first image formation member in accordance with the member information; and forming the processed image at the second image formation member.

* * * * *